Aug. 22, 1933.  R. F. MURAKAMI  1,923,578
CIRCUIT CLOSER FOR MOTOR VEHICLES
Filed March 3, 1931
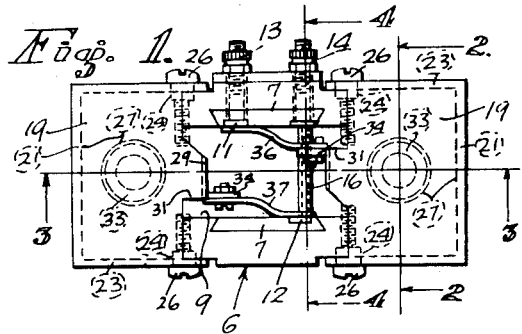
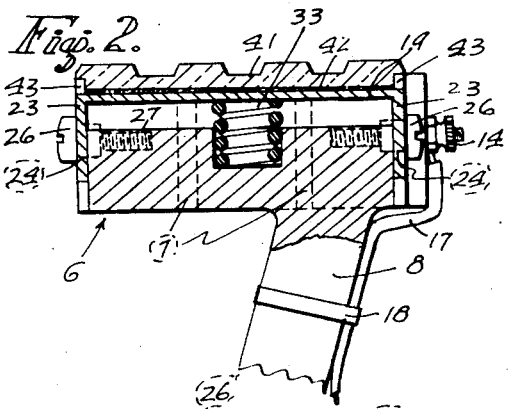
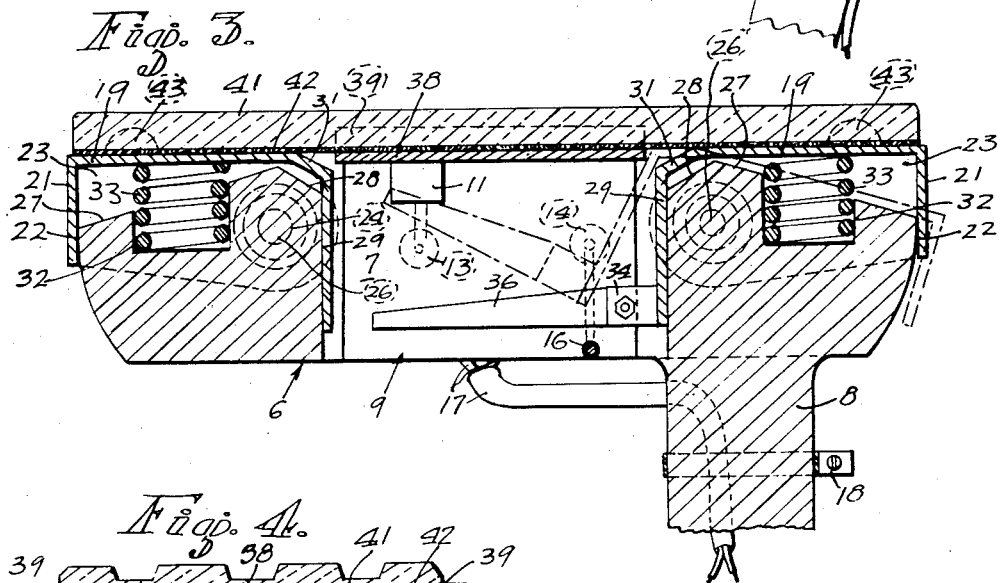
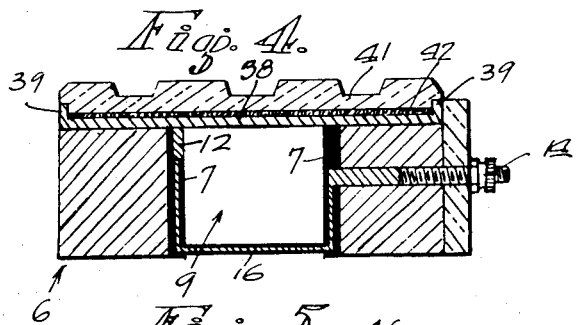
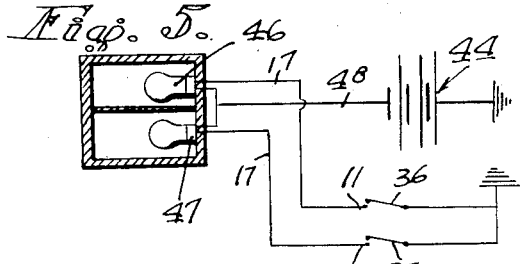
INVENTOR.
RIKUJI F. MURAKAMI
BY
ATTORNEYS.

Patented Aug. 22, 1933

1,923,578

UNITED STATES PATENT OFFICE 1,923,578

CIRCUIT CLOSER FOR MOTOR VEHICLES

Rikuji Fred Murakami, Santa Barbara, Calif.

Application March 3, 1931. Serial No. 519,725

3 Claims. (Cl. 200—59)

This invention relates to improvements in automobile direction indicating signals and more particularly to a novel and efficient switch for controlling the operation of such signals, said switch forming the foot plate of one of the operating pedals, such as the brake pedal of the automobile, and being selectively operable to actuate the signals responsive to a rocking movement of the foot of the driver when the foot is in the usual position on the pedal. The improvements herein described pertain to switches of the type described in my copending application for automobile pedal signal device, Serial No. 339,192, filed February 11, 1929.

An object of this invention is to provide a switch forming the foot plate of an operating pedal, which switch has selectively depressible end portions on which are carried contact blades to be brought into engagement with stationary terminals in the foot plate, which terminals are connected into various signal circuits; the contact blades being carried on extensions of the depressible member so formed as to hold the said depressible members aligned with the foot plate top when released, said members being resiliently urged into released positions.

Other objects and advantages are to provide an automobile direction indicating signal that will be superior in point of simplicity, inexpensiveness of construction, positiveness of operation, and facility and convenience in use and general efficiency.

In this specification and the annexed drawing, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

The invention is clearly illustrated in the accompanying drawing wherein,

Fig. 1 is a plan view of the switch with the top covering removed.

Fig. 2 is a cross sectional view of the switch, the section being taken on the line 2—2.

Fig. 3 is a longitudinal sectional view of the switch, the section being taken on the line 3—3 of Fig. 1.

Fig. 4 is a cross sectional view of the switch, the section being taken on the line 4—4 of Fig. 1.

Fig. 5 is a wiring diagram of the circuit connecting the switch to a source of electricity and to a set of signal lights.

In carrying out my invention I provide an elongated, substantially rectangular frame or casing block 6, thru the central part of which extends an aperture 9, from the top to the bottom of the block 6. The block 6 forms the foot plate of an operating rod or pedal 8 and it is preferably integral therewith.

On the opposite longitudinal side walls of the aperture 9 are secured insulating plates 7, preferably dovetailed into the walls as shown. In one end of the upper corner of one plate 7 is secured a terminal contact 11 and in the other or farther end of the upper corner of the other plate 7 is secured another terminal contact 12. A binding post 13 extending thru the side and insulated from the block 6 is directly connected to the contact 11. Another binding post 14 adjacent the post 13 is connected to the other contact 12 by means of an insulated wire 16, which latter extends at the bottom of the aperture 9. Electrical conduits or cords 17 are connected to the binding posts 13 and 14, and are secured to the clutch pedal rod 8 by means of a clamp 18.

On the opposite ends of the pedal block 6 are pivoted treadle plates 19. Each treadle plate 19 covers the respective end of the block 6. A flange 21 extends from the ends of each plate 19, downwardly and over the adjacent end 22 of the block 6. Opposite pivot flanges 23 extend downwardly from each plate 19 over the sides of the block 6, and have a hole 24 adjacent the inner ends thereof thru which a pivot screw 26 is inserted. The screws 26 are threadedly secured in the opposite sides of the block 6 at each end thereof outside of and adjacent the upper corners of the aperture 9. The treadle plates 19 are thus pivoted on the ends of the block 6. The top of each end of the block 6 is cut off to form a face 27 inclined toward the end face 22 to allow the outward tilting of the treadle plates 19 thereover. The inside corner of each block end is cut off at 28 to taper toward the aperture 9 to provide space for the free tilting movement of an extension 29 on the inner edge of each treadle plate 19.

Each extension 29 is formed intermediate the ends of the inner edge of the treadle plate 19, and it is first bent on an incline as at 31, then it extends at right angles to the top of the respective plate 19 and over the adjacent end of the aperture 9.

Each inclined top face 27 has a vertical recess 32 therein in which is positioned a compression spring 33 bearing against the underside of the top of the respective treadle plate 19 to urge the said treadle plate into horizontal position, in alignment with the top of the aperture 9. The treadle plates 19 are held in horizontal position by reason of the fact that the extensions 29 thereof bear against the respective end walls of the aperture 9 and resist any movement of the treadle plates beyond the said horizontal position.

On the lower ends of the extensions 29 are lugs 34, and to the respective lugs 34 are secured the ends of contact blades 36 and 37 so as to be normally held in a horizontal position adjacent the bottom part of the aperture 9. The blade 36 is bent toward the side of the aperture on which the contact plate 11 is disposed, so that when the treadle plate is depressed, the free end of the blade 36 is brought over the contact plate 11 thereby to close an electric circuit. The other blade 37 is bent toward the other side of the aperture 9 so that the free end thereof is brought into engagement with the contact plate 12 when the other treadle plate is depressed, thereby closing another electric circuit. It is to be noted that the lugs 34 are formed on the edge of the respective extensions 29 adjacent to the side on which the respective contact blades bear, so that the lugs 34 are laterally offset relatively to each other.

The top of the aperture 9 is covered by a plate suitably secured in place on the top of the block 6, said cover plate 38 having edge flanges 39, which provide for holding a flexible rubber tread strip 41 on top of the foot plate or block 6. A flexible fabric lining 42 extends underneath the rubber strip 41 and over the plate 38 and the tops of the treadle housings or plates 19. The treadle plates 19 have upwardly extended edge lugs 43 on the opposite sides thereof to retain the end portions of the strip 41 in place. The top surface of the rubber strip 41 may be corrugated or otherwise roughened to prevent slipping of the foot thereon.

The contact blades 36 and 37 are grounded thru the treadle plates 19, pedal 6 and pedal rod 8. A terminal of the source of electricity such as the battery 44 is also grounded, thus establishing the connection to the blades 36 and 37. The contact plate 11 is connected thru the binding post 13 and one of the wires 17 to a signal light 46, and the other contact plate 12 is connected through the post 14 and the other wire 17 to another signal light 47. The other terminals of the lights 46 and 47 are connected together thru a line 45 to the battery 44.

When it is desired to light the signal 46, the operator with his foot placed on the pedal and lying on the rubber strip 41, rocks his foot to depress the treadle plate 19 on which the blade 36 is carried, thereby to move the blade 36 into the position indicated in broken lines in Fig. 3, thus closing the electric circuit of the signal light 46. Similarly the depressing of the other treadle plate 19 moves the blade 37 into circuit closing position to operate the signal light 47. The switch connections are preferably so arranged, that the signal indicating a right hand turn is operated by the treadle plate to the right of the operator's foot, and the left hand turn indicator is operated by the treadle plate to the left of the foot of the operator.

The construction and arrangement of the switch of this invention is such that the central portion of the switch provides a non-yielding foot rest on the pedal, whereas the end portions are yieldable and depressible when the foot is pressed thereon.

Having thus described this invention, what I claim and desire to secure by Letters Patent is:

1. A switch mechanism comprising a pedal frame forming the foot plate of an operating pedal of a vehicle, said pedal frame having a recess therein intermediate its ends, stationary contacts disposed on opposite sides of the recess being insulated from the pedal frame, and connected to various electric circuits of the vehicle; a depressible member pivoted over each end of the pedal frame so as to be movable downwardly, the ends of the pedal frame being cut away to allow the movement of said members; resilient means on the cut away ends of the pedal frame to urge the said members into alignment with the top of the casing, an extension on the inside edge of each member extending into the recess and being urged into engagement with the adjacent wall of the recess to prevent the movement of the respective member beyond the aligned positions thereof; a contact blade on each extension adapted to be contacted with the adjacent stationary contacts when the adjacent member is depressed, said contact blades being connected to a source of electricity to selectively close various circuits of the vehicle thru the said contacts.

2. A switch mechanism comprising a pedal frame forming the foot plate of an operating pedal of a vehicle, said pedal frame having a recess therein intermediate its ends, stationary contacts disposed on opposite sides of the recess being insulated from the pedal frame, and connected to various electric circuits of the vehicle; a depressible member pivoted over each end of the pedal frame so as to be movable downwardly, the ends of the pedal frame being cut away to allow the movement of said members; resilient means on the cut away ends of the pedal frame to urge the said members into alignment with the top of the pedal frame; an extension on the inside edge of each member extending into the recess and being urged into engagement with the adjacent wall of the recess to prevent the movement of the respective member beyond the aligned positions thereof; a contact blade on each extension adapted to be contacted with the adjacent stationary contacts when the adjacent member is depressed, said contact blades being connected to a source of electricity to selectively close various circuits of the vehicle thru the said contacts; a flexible cover fastened over the top of the pedal frame and the said members and retaining flanges on the top of the pedal frame and on said members to hold the cover in position.

3. A switch mechanism comprising a pedal frame forming the foot plate of an operating pedal of a vehicle, said pedal frame having a recess therein intermediate its ends, stationary contacts disposed on opposite sides of the recess being insulated from the pedal casing and connected to various electric circuits of the vehicle; a depressible member pivoted over each end of the pedal frame so as to be movable downwardly, the ends of the pedal frame being cut away to allow the movement of said members; resilient means on the cut away ends of the pedal frame to urge the said members into alignment with the top of the pedal frame; an extension on the inside edge of each member extending into the recess and being urged into engagement with the adjacent wall of the recess to prevent the movement of the respective member beyond the aligned positions; a contact blade on each extension adapted to be contacted with the adjacent stationary contacts when the adjacent member is depressed, said contact blades being connected to a source of electricity to selectively close various circuits of the vehicle thru the said contacts, each of said members comprising a housing having the sides and end thereof extended over the sides and the adjacent end of the pedal frame, and being pivoted adjacent the inner top corners of its sides.

RIKUJI FRED MURAKAMI.